(12) United States Patent
Dewald

(10) Patent No.: US 6,499,863 B2
(45) Date of Patent: Dec. 31, 2002

(54) COMBINING TWO LAMPS FOR USE WITH A ROD INTEGRATOR PROJECTION SYSTEM

(75) Inventor: Duane Scott Dewald, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/750,825

(22) Filed: Dec. 28, 2000

(65) Prior Publication Data

US 2002/0008972 A1 Jan. 24, 2002

Related U.S. Application Data

(60) Provisional application No. 60/173,284, filed on Dec. 28, 1999.

(51) Int. Cl.[7] .............................................. F21V 13/14
(52) U.S. Cl. ...................... 362/268; 362/237; 362/244; 353/30
(58) Field of Search ................................ 362/268, 237, 362/244, 235, 308, 309; 349/5, 8; 353/30, 31, 32, 33, 20, 1

(56) References Cited

U.S. PATENT DOCUMENTS

| | | | | |
|---|---|---|---|---|
| 5,012,274 A | * | 4/1991 | Dolgoff | 349/5 |
| 5,071,230 A | * | 12/1991 | Hatano et al. | 359/53 |
| 5,634,704 A | * | 6/1997 | Shikama et al. | 353/31 |
| 6,231,193 B1 | * | 5/2001 | Sugawara | 353/102 |
| 6,341,876 B1 | * | 1/2002 | Moss et al. | 362/268 |

* cited by examiner

Primary Examiner—Thomas M. Sember
(74) Attorney, Agent, or Firm—Charles A. Brill; Wade James Brady, III; Frederick J. Telecky, Jr.

(57) ABSTRACT

A display system (800) combining light from two sources into a single light beam that is modulated by a light valve to form an image. Light from a first light source (802) is anamorphically focused along a first light path by a first lens group (804) and a second lens group (806). The first and second lens groups are typically cylindrical lenses having perpendicular axes. The two lens groups focus the light from the first light source onto an integrating rod (808). In a similar manner, light from a second light source (810) is anamorphically focused along a second light path by a first lens group (812) and a second lens group (814) onto the same integrating rod (808). Light from the integrating rod (808) illuminates a light valve (816). Light valve (816) typically is a micromirror device or a liquid crystal panel. The light valve modulates the light from the integrating rod (808) to form a modulated light beam that is focused by projection optics (822) onto an image plane (824). The light valve modulates the light in response to signals received from controller (818), which receives and converts a video signal. In the case of a micromirror light valve, the modulation is accomplished by selectively reflecting portions of the light beam along a path toward the image plane. The light not selectively reflected to the image plane is sent to a light trap (820).

37 Claims, 6 Drawing Sheets

COMBINING TWO LAMPS FOR USE WITH A ROD INTEGRATOR PROJECTION SYSTEM

This application claims priority under 35 USC §119(e)(1) of provisional application No. 60/173,284 filed Dec. 28, 1999.

FIELD OF THE INVENTION

This invention relates to the field of display systems, more particularly to display systems using multiple light sources in combination with a spatial light modulator projection system using a rod integrator.

BACKGROUND OF THE INVENTION

Many new types of displays systems have been developed that use a spatial light modulator or light valve in combination with an illumination source to project an image. These display systems are capable of providing high resolution, high contrast images having an excellent color gamut. One of the key criteria consumers use to distinguish various display systems is the brightness of the image. High image brightness is critical in the marketplace. High image brightness enables viewers to clearly see the projected image, even in venues having a high ambient light level, and enables projection of very large images.

The brightness of the projected image is limited by the luminance, lumens per emitting area per solid angle, of the light source used in conjunction with the modulator. This is especially difficult to achieve with small light valves such as the digital micromirror device (DMD™). The DMD, which is less than an inch across, has a small etendue or area-solid angle product.

Arc lamps are very high luminance light sources, but are unacceptable for most display system applications because of their short lifetimes, generally less than 2000 hours. Other arc lamps, such as metal-halide lamps, have too large an arc to allow the lamp to be efficiently coupled to a small light valve such as a DMD. Because of the large arc, at 300–400 watt lamp may produce an image that no brighter than an image produced by a 100–150 watt small-arc lamp. A few arc lamps have both a long lifetime, between 6000 and 8000 hours, and a small etendue, but do not provide a high total flux. If these lamps can be combined, a display system could efficiently produce a high brightness image.

One technique that has been used to increase the brightness of a projected image is to use three lamps in combination with dichroic filters. The output of each lamp is filtered to provide a single primary colored light beam. The lamps sequentially are pulsed to peak the flux out of the lamp during a portion of the frame period. In concert, the three lamps act as a single sequential color source having a greater brightness than a single lamp. Unfortunately, pulsing the lamps reduces the stability of the arc and shortens the lifetime of the lamp.

What is needed is a long-life, high luminance, high flux light source that has a small etendue to enable efficient coupling to a small light valve.

SUMMARY OF THE INVENTION

Objects and advantages will be obvious, and will in part appear hereinafter and will be accomplished by the present invention that provides a method and system for combining multiple light sources in light valve projectors. One embodiment of the claimed invention provides an illumination system comprised of a first and second lamp, and a first and second lens system. The first lamp for emits light along a first light path. The first lens system is comprised of a first and second cylindrical lens group on the first light path. An orientation axis of the second cylindrical lens group is perpendicular to an orientation axis of the first cylindrical lens group. The second lamp emits light along a second light path. The second lens system is comprised of a first and second cylindrical lens group on the second light path. An orientation axis of the second cylindrical lens group is perpendicular to an orientation axis of the first cylindrical lens group. The disclosed lens system allows the two light paths to be closely spaced and efficiently coupled to an integrating rod.

A second disclosed embodiment provides a display system using the an illumination system to efficiently couple two or more light sources to an integrating rod. The display system is comprised of: a first lamp for emitting light along a first light path, a first lens system comprised of a first and second cylindrical lens group on the first light path, an orientation axis of the second cylindrical lens group on the first light path being perpendicular to an orientation axis of the first cylindrical lens group on the first light path, a second lamp for emitting light along a second light path, a second lens system comprised of a first and second cylindrical lens group on the second light path, an orientation axis of the second cylindrical lens group on the second light path being perpendicular to an orientation axis of the first cylindrical lens group on the second light path, an integrating rod having an entrance face on the first axis and the second axis, the integrating rod capable of combining beams of light on the first and second light paths into a homogenous light beam traveling along a third light path, a controller for receiving one or more image signals and outputting data signals, and a light valve on the third light path operable to modulate the homogenous light beam in response to the data signals to form an image bearing beam of light.

The disclosed optical architectures enable two small-arc light sources to be used instead of one larger light source. The small-arc light sources have a much longer life and a solid angle that is more efficiently coupled to a small light valve such as a DMD.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A method and apparatus for combining multiple light sources has been developed that provides a long-life, high luminance, high flux light source with a small etendue to enable efficient coupling to a small light valve. Combining the light beams from multiple lamps that have the same spectrum and polarization has been difficult in the past due to physical interference between the lamps and the reflectors and lenses used to gather and focus the light.

The disclosed method and apparatus efficiently combines multiple small-arc lamps to increase the total flux of the light source without resorting to pulsing or other methods that reduce the lifetime of the lamp. The apparatus uses two sets of cylindrical lenses to anamorphically focus light from two or more arc lamps onto the end of an integrating rod.

Figure 1:
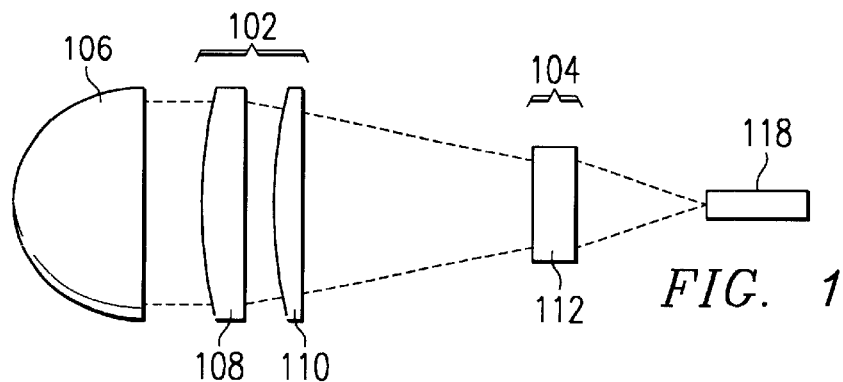
FIG. 1 is a side view of a cylindrical lens system for anamorphically focusing light from an arc lamp onto the end of an integrating rod.
Figure 2:
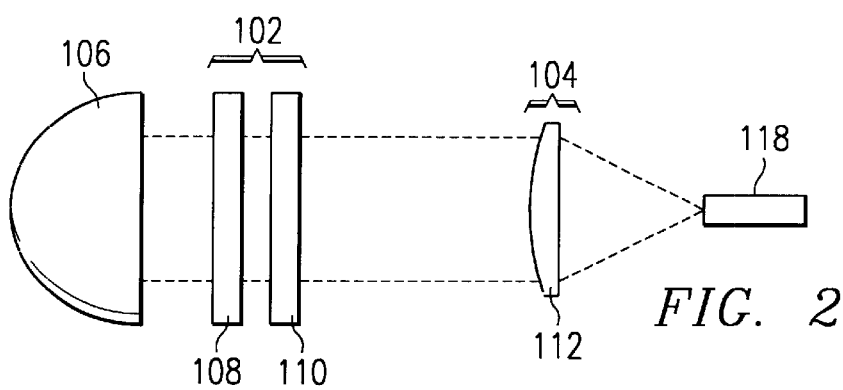
FIG. 2 is a top view of the cylindrical lens system of FIG. 1.
Figure 3:
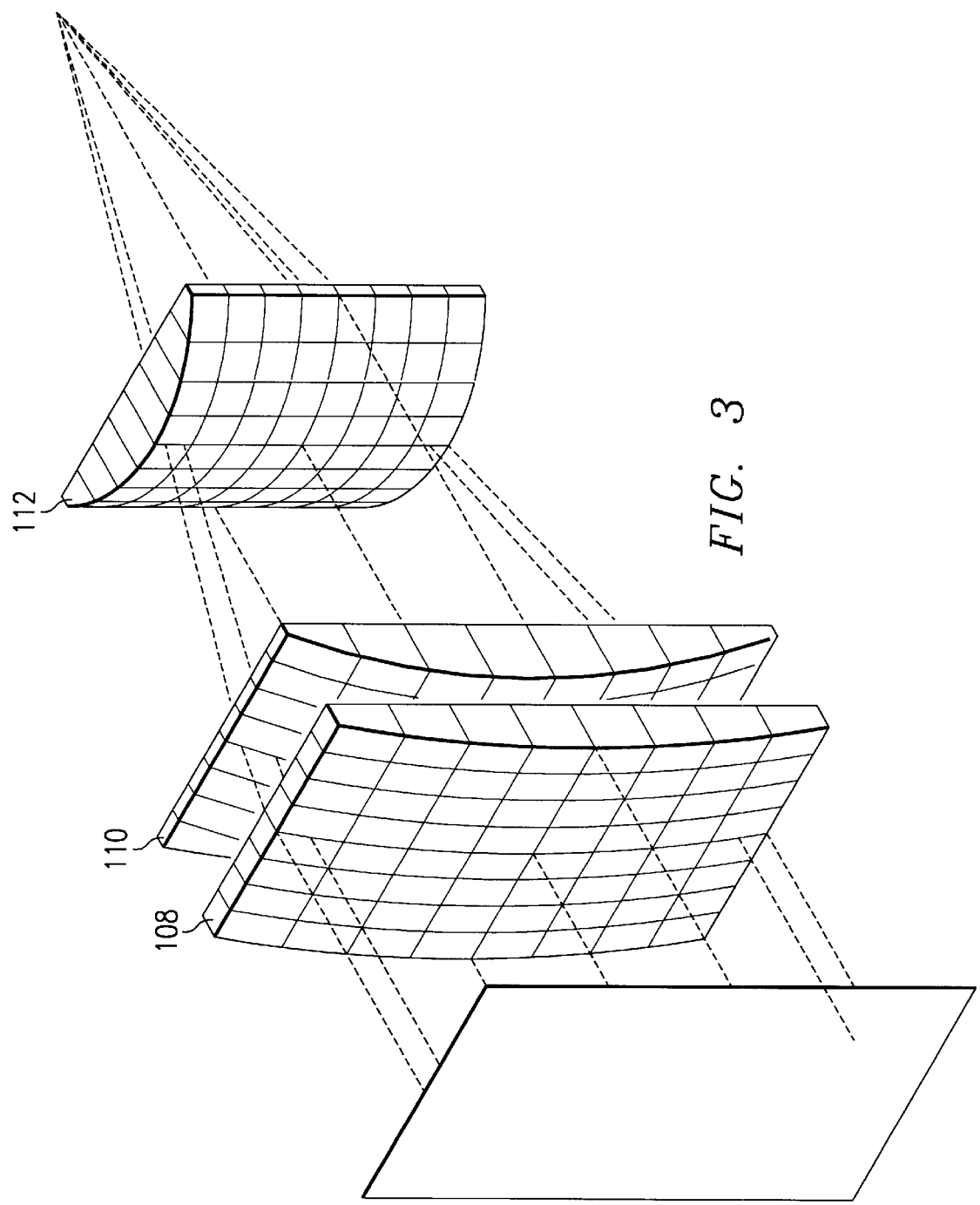
FIG. 3 is a perspective view of the cylindrical lens system of FIGS. 1 and 2.

FIG. 1 is a side view of one embodiment of the disclosed illumination system. FIG. 2 is a top view, and FIG. 3 is a perspective view of the same embodiment. In FIG. 1, a first lens group 102 is comprised of two cylindrical lenses 108, 110. The first lens group 102 anamorphically focuses the light from the light source 106. The two lenses 108, 110 in the first lens group 102 are segments of a cylinder with an axis aligned perpendicular to the plane of FIG. 1.

The second lens group 104 is shown as a single cylindrical lens 112. The cylindrical lens 112 is a segment of a cylinder with an axis that is aligned perpendicular to the plane of FIG. 2. Thus, the axis of the first lens group 102 is perpendicular to the axis of the second lens group 104. This arrangement provides a very compact illumination system. The illumination system of FIGS. 1, 2, and 3 can easily be combined with other illumination systems compactly to combine light from multiple lamps into a single beam.

Figure 9:
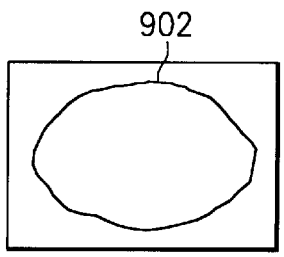
FIG. 9 is an end view of an integrating rod showing the alignment of two focused light beams with the rectangular end of the integrating rod.

An integrator rod is used to combine light beams from two or more of the illuminations systems shown. Because the focal length of the second lens group 104 is half the focal length of the first lens group 102, the image is about half as large in one direction. FIG. 9 shows the images 902 formed by each pair of first and second lens groups on the end of the integrator rod 118. The long axis of the image is aligned with the long axis of the integrator rod 118.

The integrator rod not only alters the path of each of the incident light beams so that the incident light beams are directed along a common path, it also acts to homogenize the combined light beam through multiple reflections within the integrating rod.

The integrating rod 118 can be either a solid block of a transparent material such as glass or a hollow tube with reflective inner surfaces. Once a light beam enters the integrating rod 118 it strikes, and is reflected by, the sides of the integrating rod. The sides of a glass integrating rod can be mirrored if necessary, but typically rely on internal reflection occurring as the light beam traveling through a glass integrating rod meets an interface between the glass and the surrounding air.

Figure 4:
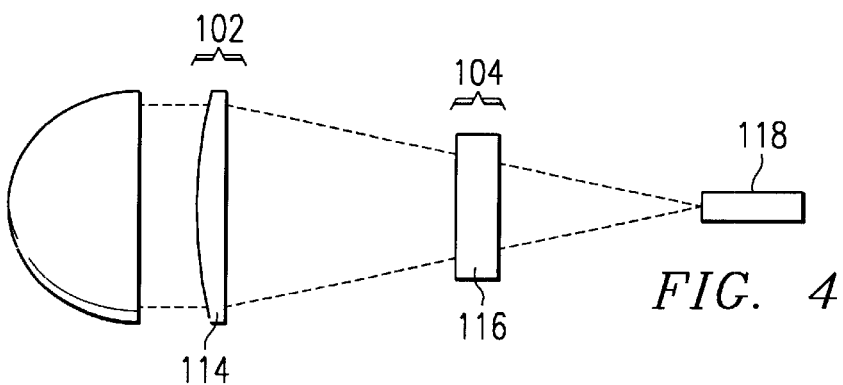
FIG. 4 is a side view of a cylindrical lens system for anamorphically focusing light from an arc lamp onto the end of an integrating rod.
Figure 5:
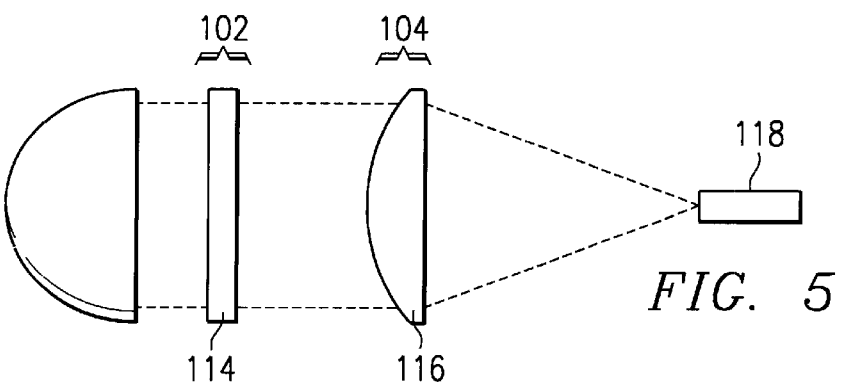
FIG. 5 is a top view of the cylindrical lens system of FIG. 4.
Figure 6:
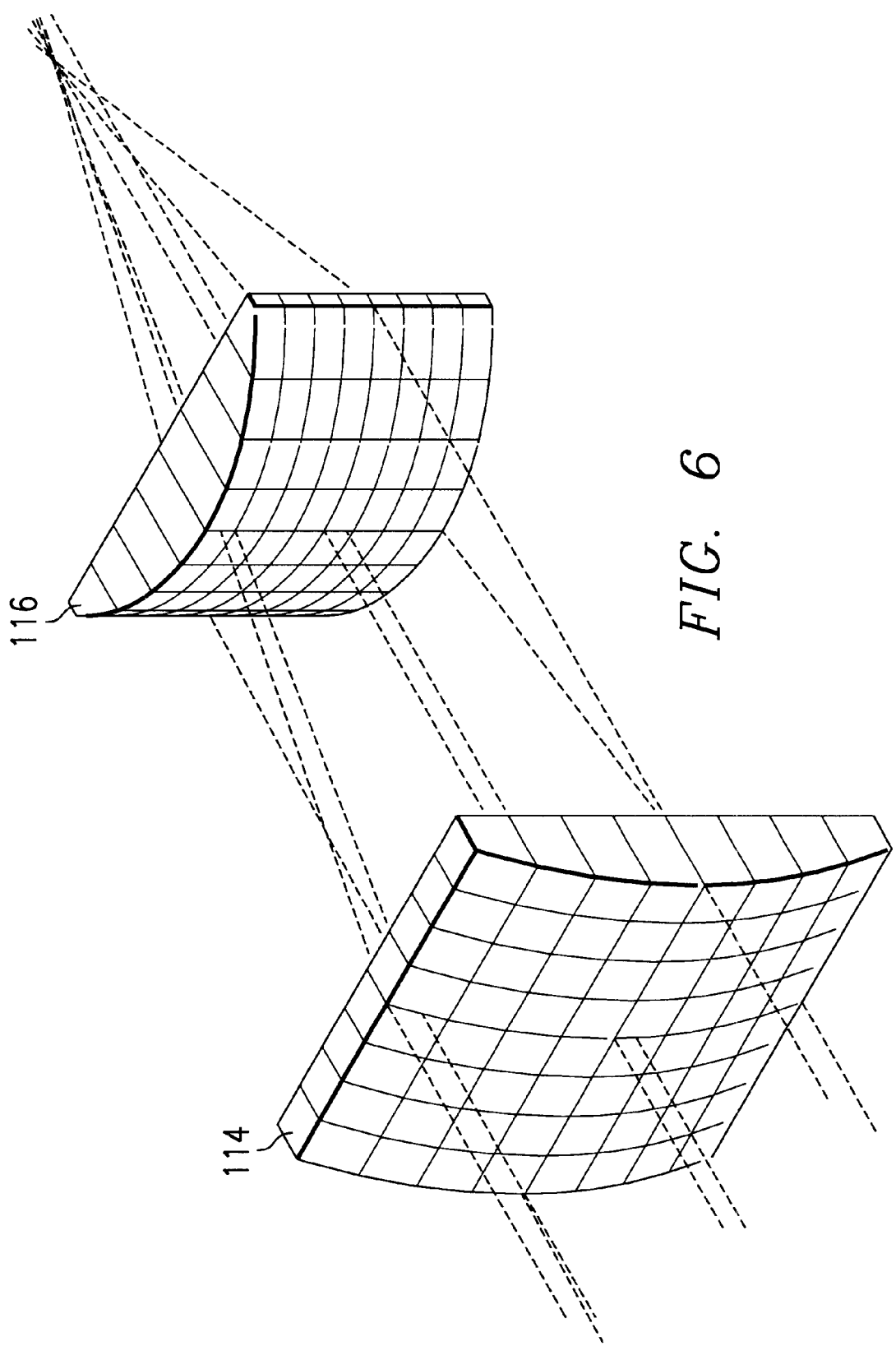
FIG. 6 is a perspective view of the cylindrical lens system of FIGS. 4 and 5.

FIG. 4 is a side view of an illumination system according to a second embodiment of the disclosed invention. FIG. 5 is a top view, and FIG. 6 is a perspective view of the same embodiment. Like the previous embodiment, the illumination system of FIG. 4 uses two cylindrical lens groups that have axes aligned perpendicular to each other. In FIG. 4, the first lens group 102 is comprised of a single lens 114. Lens 114 has a focal length of approximately 200 mm in the embodiment shown in FIGS. 4, 5, and 6. Once again, lens group 104 is shown as a single lens 116. Lens 116 has a focal length of 100 mm in the embodiment shown in FIGS. 4, 5, and 6. The lenses shown in FIG. 4 provide an illumination system that is approximately 12 inches long and 3 inches wide. The width of the illumination system is determined primarily by the size of the reflector used by the light source 106.

Many other embodiments of the disclosed illumination system are possible. Other embodiments use more than two lenses for the first lens group 102, or more than one lens for the second lens group 104, or both. Furthermore, other embodiments add prism to the cylindrical lenses to further compact the illumination system.

Figure 10:
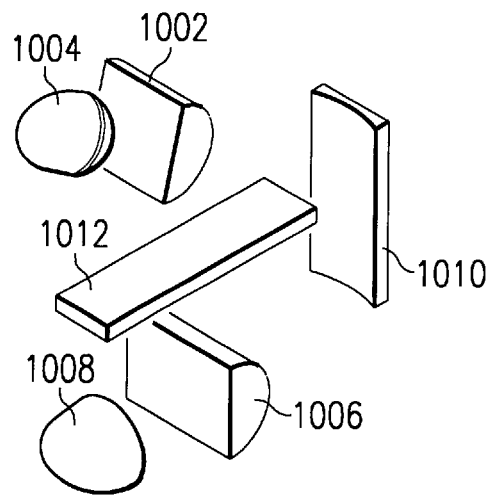
FIG. 10 is a perspective view of an illumination system similar to the system of FIG. 7 but using single concave cylindrical mirror to replace the two second lens groups shown in FIG. 7.

Alternate embodiments replace one or more of the cylindrical lenses with concave cylindrical mirrors. FIG. 10 is a perspective view of an illumination system using a first cylindrical lens 1002 to collect light from a first light source 1004, and a second cylindrical lens 1006 to collect light from a second light source 1008. The light from each source is focused onto a cylindrical concave mirror 1010 shared by both illumination paths to anamorphically focus the beams of light along a second axis. The beams are reflected by the common mirror to the end of an integrator rod 1012.

Figure 7:
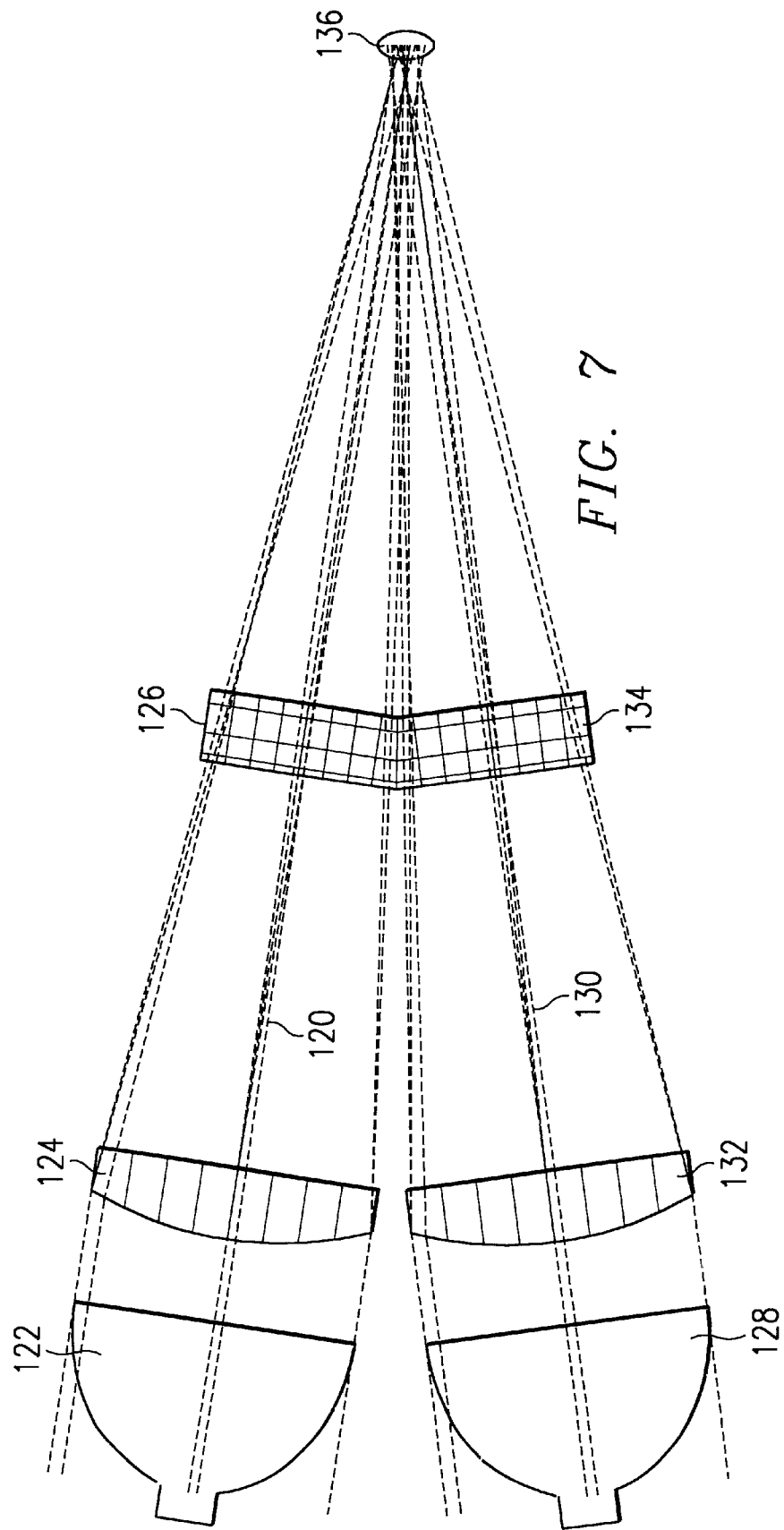
FIG. 7 is a side view of two of the cylindrical lens systems of FIGS. 1, 2, and 3 combining light from two arc lamps onto a single integrating rod.
Figure 11:
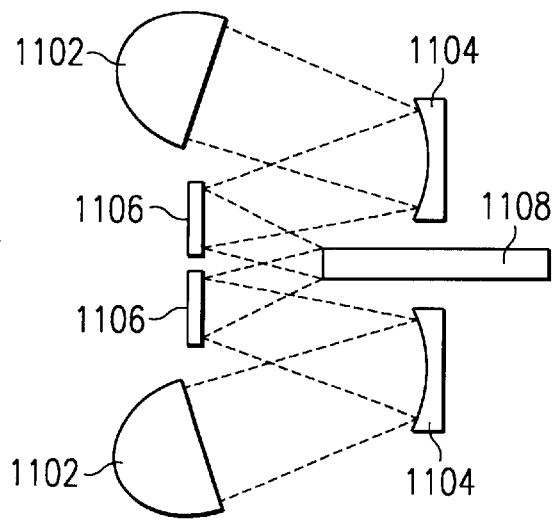
FIG. 11 is a side view of an illumination system similar to the illumination system of FIG. 10, but using two concave cylindrical mirrors in place of the two cylindrical lenses of FIG. 10, and two concave cylindrical mirrors in place of the common concave cylindrical mirror of FIG. 10.

FIG. 11 is a side view of another illumination system showing two mirrors replacing the first lens group and the second lens group in each illumination path. In FIG. 11, light from a light source 1102 is reflected and anamorphically focused by a first concave mirror 1104. A second concave cylindrical mirror 1106, with an axis orthogonal to the axis of the first concave mirror anamorphically focuses the light along a second axis onto an integrating rod 1108. The FIG. 7 is a side view of an illumination system using two sets of lenses and lamps similar to those shown in FIGS. 4–6. The first lamp 122 projects a light beam along a first path 120 that is anamorphically focused by a first lens 124 and a second lens 126 that is aligned perpendicularly to the first lens 124. A second lamp 128 projects a second light beam along a second path 130. A first 132 and second 134 lens along the second light path 130 anamorphically focus the light from the second lamp 128 onto the same region 136 that the light from the first lamp 122 is focused onto.

Figure 8:
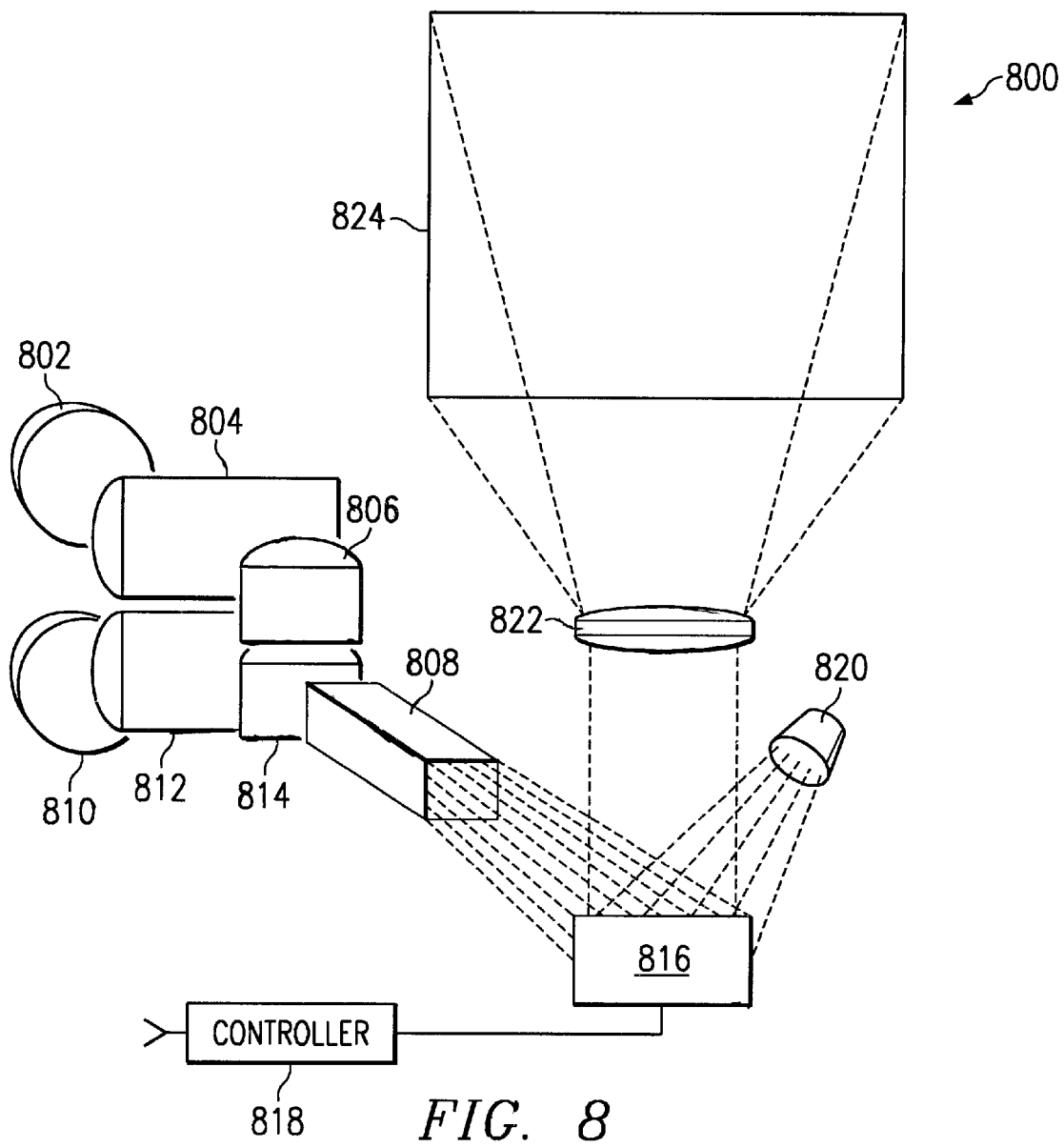
FIG. 8 is a schematic view of a display system using the disclosed lens system to combine light from two arc lamps into a single light beam that is modulated to form an image.

FIG. 8 shows a display system 800 combining light from two sources into a single light beam that is modulated by a light valve to form an image. Light from a first light source 802 is anamorphically focused along a first light path by a first lens group 804 and a second lens group 806. The first and second lens groups are typically cylindrical lenses having perpendicular axes. The two lens groups focus the light from the first light source onto an integrating rod 808. In a similar manner, light from a second light source 810 is anamorphically focused along a second light path by a first lens group 812 and a second lens group 814 onto the same integrating rod 808. Light from the integrating rod 808 illuminates a light valve 816. Light valve 816 is typically a micromirror device or a liquid crystal panel. The light valve modulates the light from the integrating rod 808 to form a modulated light beam that is focused by projection optics 822 onto an image plane 824. The light valve modulates the light in response to signals received from controller 818, which receives and converts a video signal. In the case of a micromirror light valve, the modulation is accomplished by selectively reflecting portions of the light beam along a path toward the image plane. The light not selectively reflected to the image plane is sent to a light trap 820.

Thus, although there has been disclosed to this point a particular embodiment for optical architectures for combining multiple lamps, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. An illumination system comprising:
   a first lamp for emitting light along a first light path;
   a first lens system, said first lens system comprising:
      a first cylindrical lens group on said first light path; and
      a second cylindrical lens group on said first light path, an orientation axis of said second cylindrical lens group on said first light path being perpendicular to an orientation axis of said first cylindrical lens group on said first light path;
   a second lamp for emitting light along a second light path;
   a second lens system, said second lens system comprising:
      a first cylindrical lens group on said second light path; and
      a second cylindrical lens group on said second light path, an orientation axis of said second cylindrical lens group on said second light path being perpendicular to an orientation axis of said first cylindrical lens group on said second light path;
   an integrating rod having an entrance face on said first axis and said second axis.

2. The illumination system of claim 1, said first lens group on said first light path comprised of at least one anamorphic lens.

3. The illumination system of claim 1, said first lens group on said first light path comprised of at least one mirror.

4. The illumination system of claim 1, said first lens group on said first light path comprised of at least one cylindrical mirror.

5. The illumination system of claim 1, said second lens group on said first light path comprised of at least one anamorphic lens.

6. The illumination system of claim 1, said second lens group on said first light path comprised of at least one mirror.

7. The illumination system of claim 1, said second lens group on said first light path comprised of at least one cylindrical mirror.

8. The illumination system of claim 1, said first lens group on said second light path comprised of at least one anamorphic lens.

9. The illumination system of claim 1, said first lens group on said second light path comprised of at least one mirror.

10. The illumination system of claim 1, said first lens group on said second light path comprised of at least one cylindrical mirror.

11. The illumination system of claim 1, said second lens group on said second light path comprised of at least one anamorphic lens.

12. The illumination system of claim 1, said second lens group on said second light path comprised of at least one mirror.

13. The illumination system of claim 1, said second lens group on said second light path comprised of at least one cylindrical mirror.

14. The illumination system of claim 1, said first lamp being an arc lamp.

15. The illumination system of claim 1, said first lamp being an arc lamp and a reflector.

16. The illumination system of claim 1, said first lamp being an arc lamp and an elliptical reflector.

17. The illumination system of claim 1, said first lamp being an arc lamp and a parabolic reflector.

18. The illumination system of claim 1, said second lamp being an arc lamp.

19. The illumination system of claim 1, said second lamp being an arc lamp and a reflector.

20. The illumination system of claim 1, said second lamp being an arc lamp and an elliptical reflector.

21. The illumination system of claim 1, said second lamp being an arc lamp and an parabolic reflector.

22. A display system comprising:
   a first lamp for emitting light along a first light path;
   a first lens system, said first lens system comprising:
      a first cylindrical lens group on said first light path; and
      a second cylindrical lens group on said first light path, an orientation axis of said second cylindrical lens group on said first light path being perpendicular to an orientation axis of said first cylindrical lens group on said first light path;
   a second lamp for emitting light along a second light path;
   a second lens system, said second lens system comprising:
      a first cylindrical lens group on said second light path; and
      a second cylindrical lens group on said second light path, an orientation axis of said second cylindrical lens group on said second light path being perpendicular to an orientation axis of said first cylindrical lens group on said second light path;
   an integrating rod having an entrance face on said first axis and said second axis, said integrating rod capable of combining beams of light on said first and second light paths into a homogenous light beam traveling along a third light path;
   a controller for receiving one or more image signals and outputting data signals; and
   a light valve on said third light path, said light valve operable to modulate said homogenous light beam in response to said data signals to form an image bearing beam of light.

23. The display system of claim 22, said light valve being a micromirror device.

24. The display system of claim 22, said light valve being a liquid crystal panel.

25. The display system of claim 22, further comprising projection optics for focussing said image bearing beam of light onto an image plane.

26. The display system of claim 22, said first lens group on said first light path comprised of at least one anamorphic lens.

27. The display system of claim 22, said first lens group on said first light path comprised of at least one mirror.

28. The display system of claim 22, said first lens group on said first light path comprised of at least one cylindrical mirror.

29. The display system of claim 22, said second lens group on said first light path comprised of at least one anamorphic lens.

30. The display system of claim 22, said second lens group on said first light path comprised of at least one mirror.

31. The display system of claim 22, said second lens group on said first light path comprised of at least one cylindrical mirror.

32. The display system of claim 22, said first lens group on said second light path comprised of at least one anamorphic lens.

33. The display system of claim 22, said first lens group on said second light path comprised of at least one mirror.

34. The display system of claim 22, said first lens group on said second light path comprised of at least one cylindrical mirror.

35. The display system of claim 22, said second lens group on said second light path comprised of at least one anamorphic lens.

36. The display system of claim 22, said second lens group on said second light path comprised of at least one mirror.

37. The display system of claim 22, said second lens group on said second light path comprised of at least one cylindrical mirror.

* * * * *